United States Patent
Lai

(10) Patent No.: US 9,031,544 B2
(45) Date of Patent: May 12, 2015

(54) STATUS SWITCHING METHOD FOR MOBILE DEVICE

(71) Applicant: HTC Corporation, Taoyuan County (TW)

(72) Inventor: Chun-Yu Lai, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/732,447

(22) Filed: Jan. 2, 2013

(65) Prior Publication Data
US 2014/0187222 A1   Jul. 3, 2014

(51) Int. Cl.
*H04M 3/00*        (2006.01)
*H04W 8/22*        (2009.01)
*H04M 1/725*       (2006.01)

(52) U.S. Cl.
CPC ............ *H04W 8/22* (2013.01); *H04M 1/72519* (2013.01); *H04M 1/72577* (2013.01)

(58) Field of Classification Search
CPC ....... H04W 8/245; H04W 84/06; H04W 8/22; H04W 8/24; G06F 1/3203; G06F 1/10; G06F 1/3287; G07C 5/008; G01C 23/00; H04M 1/72525; H04B 1/034

USPC ............ 455/98, 431; 701/2, 3; 713/320, 323, 713/324, 401
See application file for complete search history.

(56) References Cited

U.S. PATENT DOCUMENTS

| | | | |
|---|---|---|---|
| 6,526,285 B1 * | 2/2003 | Matsumoto et al. | 455/457 |
| 7,359,695 B2 * | 4/2008 | Ganzera et al. | 455/343.2 |
| 7,383,457 B1 * | 6/2008 | Knight | 713/323 |
| 8,504,121 B1 * | 8/2013 | Pan | 455/574 |
| 2005/0267650 A1 * | 12/2005 | Carpenter et al. | 701/3 |
| 2011/0185208 A1 * | 7/2011 | Iwamoto et al. | 713/323 |

* cited by examiner

*Primary Examiner* — Amancio Gonzalez
(74) *Attorney, Agent, or Firm* — Winston Hsu; Scott Margo

(57) ABSTRACT

A status switching method for a mobile device is disclosed. The status switching method includes receiving a first request for switching a radio function of the mobile device from a first status to a second status; keeping the radio function in the first status for a specific duration; switching the radio function to the second status if not receiving a second request for switching the radio function of the mobile device from the second status to the first status during the specific duration; and remaining the radio function in the first status if receiving a second request for switching the radio function of the mobile device from the second status to the first status during the specific duration; and switching the radio function to the first status.

12 Claims, 5 Drawing Sheets

STATUS SWITCHING METHOD FOR MOBILE DEVICE

BACKGROUND OF THE INVENTION

1. Field of the Invention

The present invention relates a status switching method for a mobile device, and more particularly, to a status switching method capable of switching off modem power after receiving a airplane mode on request for a specific duration, so as to save time for loading radio ROM image when frequently switching between deactivating and activating an airplane mode (radio on and radio off).

2. Description of the Prior Art

Nowadays, mobile phones are widely used. In some circumstances, people might attempt to rapidly change the cellular phone status (deactivating and activating an airplane mode for radio on and radio off). Since a single cellular phone status change might require many steps and processes inside system, it would be time consuming while waiting the status change to finish.

For example, volatile memory (flashless) devices sustain data only when the power is supplied to the memory chips. Data is lost when power is off. If a volatile memory chip is applied in a wireless communication modem system, data of radio image is lost when the power is off. For the concern of power conservation, the conventional design would directly turn off the modem power after an airplane mode is activated (i.e. radio off), and thus all modem data is lost. Therefore, when a request for deactivating the airplane mode (radio on) is issued, the radio image containing the modem data needs to be reloaded from non-volatile memory (i.e. NAND Flash) to volatile memory during the radio on procedure. This is time-consuming.

Under such a situation, as the size of radio image becomes bigger and the airplane mode is frequently deactivated and activated, the time-consuming becomes more serious. Thus, there is a need to improve the prior art.

SUMMARY OF THE INVENTION

It is therefore an objective of the present invention to provide a status switching method capable of continuously keeps initial deactivating status of the airplane mode after receiving an airplane mode on request for a specific duration, so as to save time for loading radio ROM image when frequently switching between activating and deactivating an airplane mode.

The present invention discloses a status switching method for a mobile device. The status switching method includes receiving a first request for switching a radio function of the mobile device from a first status to a second status; keeping the radio function in the first status for a specific duration; switching the radio function to the second status if not receiving a second request for switching the radio function of the mobile device from the second status to the first status during the specific duration; and remaining the radio function in the first status if receiving a second request for switching the radio function of the mobile device from the second status to the first status during the specific duration; and switching the radio function to the first status.

DETAILED DESCRIPTION

Figure 1:
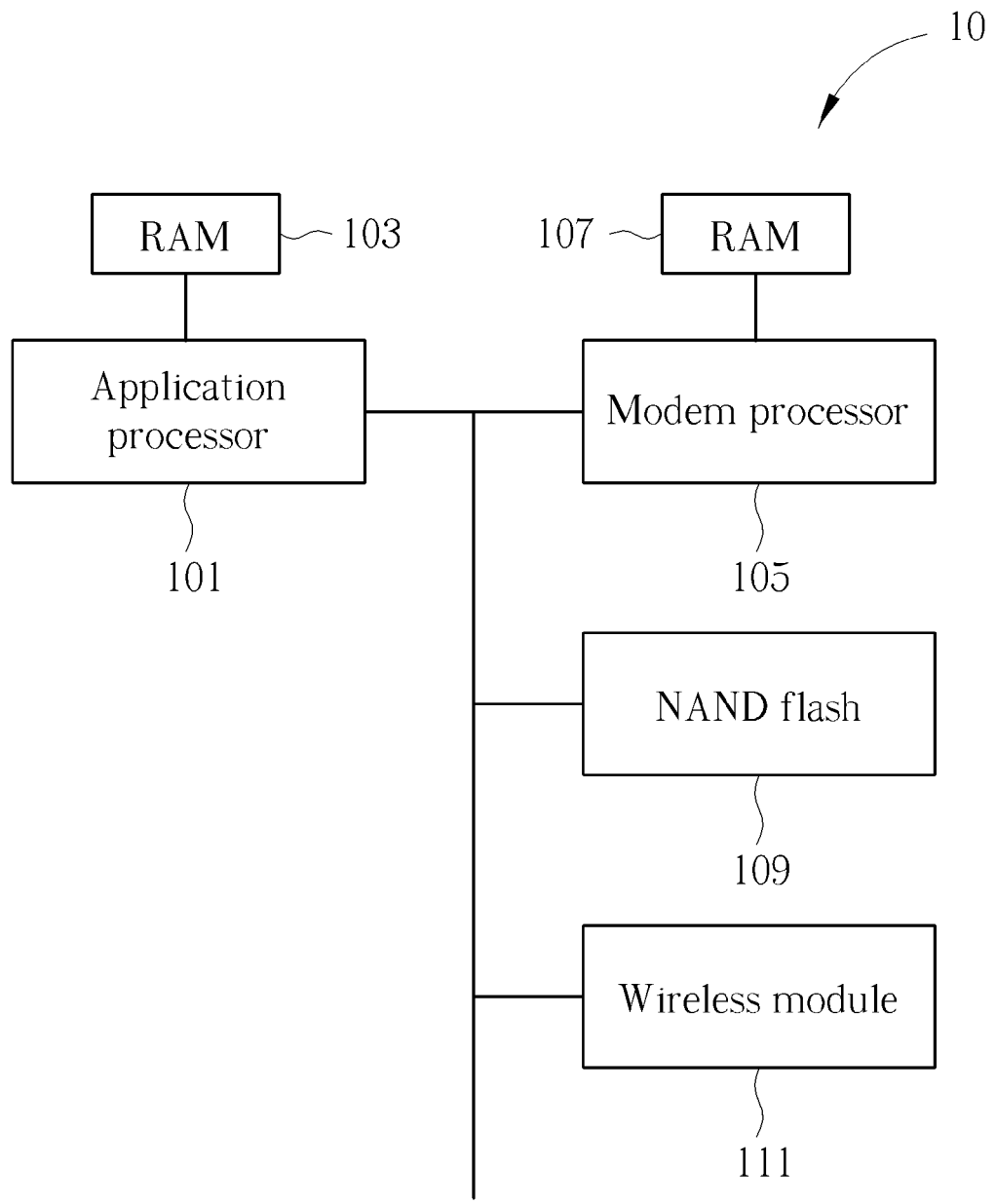
FIG. 1 illustrates a mobile device.

Please refer to FIG. 1, which illustrates a mobile device 10. The mobile device 10 includes an application processor 101, random access memories (RAMs) 103, 107, a modem processor 105, a NAND flash 109, and a wireless module 111. In detail, the application processor 101 executes operation system and user layer application. The application read only memory (ROM) image basically contains the binary code of operation system and applications, and is initially stored in the NAND flash 109. Since the NAND flash 109 is a block device that the application processor 101 can not directly execute software program on, the binary code needs to be loaded into the RAM 103 for execution. When the mobile device 10 is powered up, the application ROM image is loaded into the RAM 103 to execute and bring up operation system and user layer applications. Sometime the binary code might be compressed when stored in the NAND flash 109 so that the binary code has to be uncompressed before execution.

The modem processor 105 mainly provides the cellular telephony network service functions such as global system for mobile communications (GSM), universal mobile telecommunications system (UMTS), code division multiple access (CDMA), wideband code division multiple access (WCDMA) and long term evolution (LTE). The modem processor 105 is coupled to the application processor 101 in order to communicate with the user layer application such as phone dialer for user to make or receive phone call. Besides, the modem processor 105 also needs to load the radio ROM image from the NAND flash 109 to the RAM 107 for execution, wherein the radio ROM image is the software binary code providing the cellular telephony network service functions especially handling the cellular network protocols.

Noticeably, the RAMs 103, 107 are where the software program executing, and also act as system temporary storage so called cache for temporarily storing software program data and user data. The RAMs 103, 107 can be implemented by a volatile memory such as synchronous dynamic random access memory (SDRAM) or static random access memory (SRAM). The wireless module 111 provides the wireless communication channels to external devices. The wireless communication channels include Bluetooth and WLAN.

In the mobile device 10, turning on the airplane mode means to activate airplane mode (radio off). In the airplane mode, the mobile device 10 turns off all wireless communication function such as cellular telephony network services (GSM, UMTS, CDMA, WCDMA, LTE), Bluetooth, WLAN and etc. On the other hand, turning off the airplane mode means to deactivate the prohibition of all wireless communication access abilities (radio on). To simply illustration, the following description mainly focuses on the cellular telephony network service instead of other wireless functions like Bluetooth and WLAN.

Figure 2:
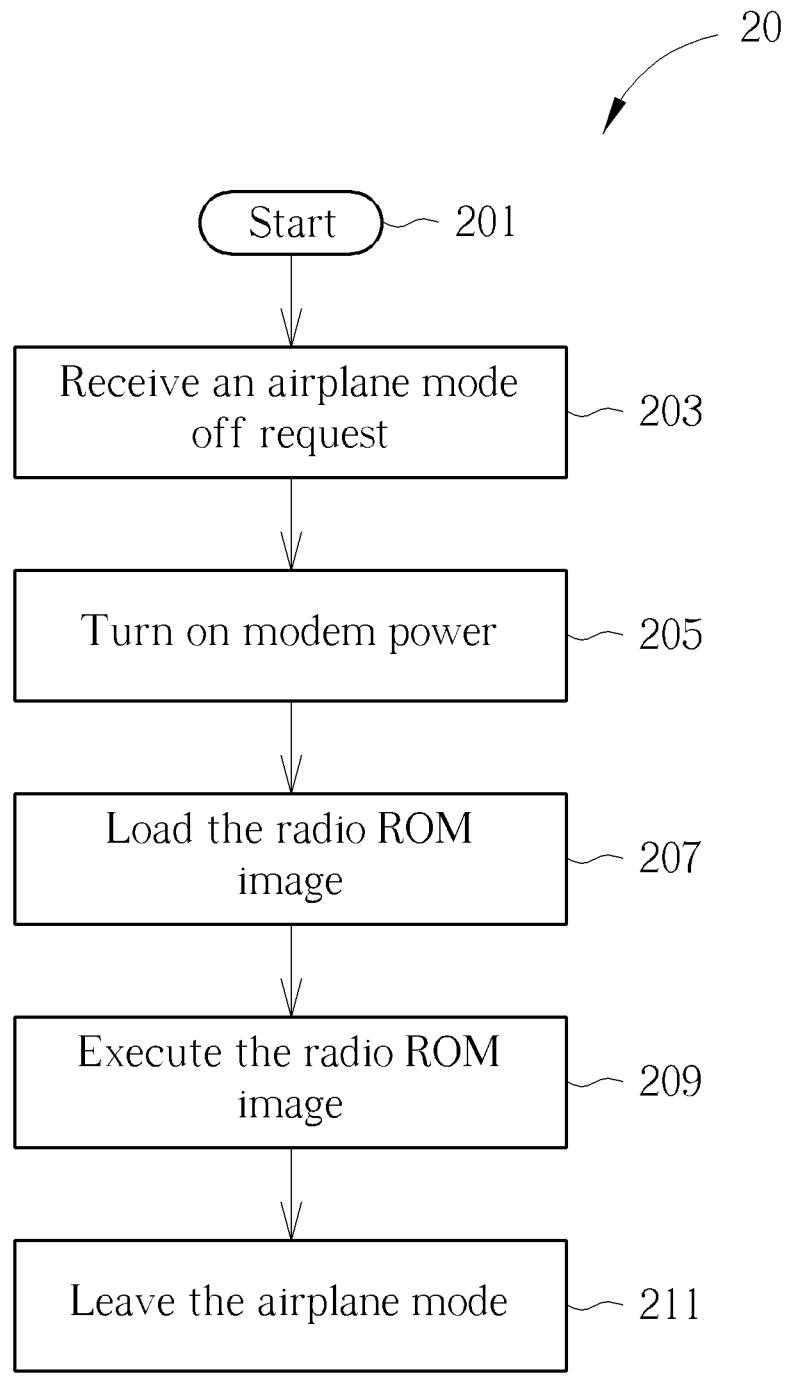
FIG. 2 illustrates a conventional airplane mode off process.

Please refer to FIG. 2, which illustrates a conventional airplane mode off process 20. As shown in FIG. 2, the airplane mode off process 20 is utilized for the mobile device 10, and includes following steps:

Step 201: Start.
Step 203: Receive an airplane mode off request.
Step 205: Turn on modem power.
Step 207: Load the radio ROM image.

Step 209: Execute the radio ROM image.

Step 211: Leave the airplane mode.

According to the airplane mode off process 20, in an initial status, the mobile device 10 activates an airplane mode, and disables the cellular telephony network service. Then, when a user requests to turn off the airplane mode (e.g. by tapping the airplane mode UI button or an UI image icon on a touch panel of the mobile device 10 or pressing a physical key of the mobile device 10), the mobile device 10 receives an airplane mode off request. Then the application processor 101 turns on the power of the modem processor 105 and loads the radio ROM image from the NAND flash 109 to the RAM 107. Once the radio ROM image is loaded into the RAM 107, the modem processor 105 starts executing the radio ROM image. As soon as the hardware and software initialization is finished, the modem processor 105 provides cellular telephony network services, such that the mobile device 10 leaves the airplane mode.

Figure 3:
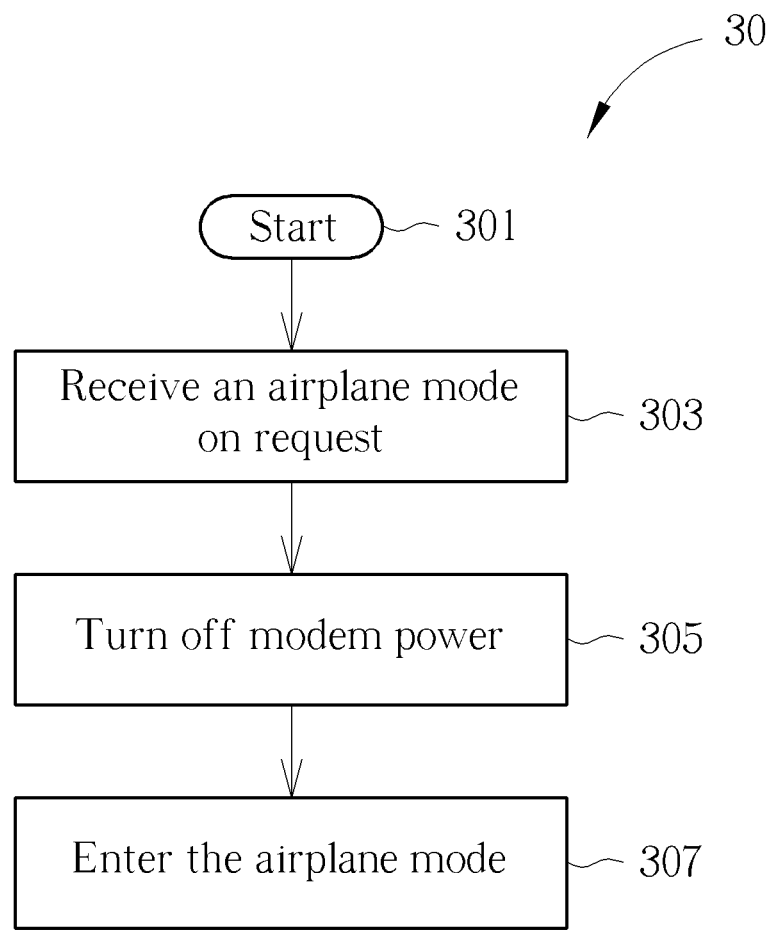
FIG. 3 illustrates a conventional airplane mode on process.

Please refer to FIG. 3, which illustrates a conventional airplane mode on process 30. As shown in FIG. 3, the airplane mode on process 30 includes following steps:

Step 301: Start.

Step 303: Receive an airplane mode on request.

Step 305: Turn off modem power.

Step 307: Enter the airplane mode.

According to the airplane mode on process 30, in an initial status, the mobile device 10 deactivates an airplane mode, and enables the cellular telephony network service. Then, when a user requests to turn on the airplane mode (e.g. by tapping the airplane mode UI button or UI image icon on touch panel of the mobile device 10 or pressing a physical key of the mobile device 10), the mobile device 10 receives an airplane mode on request. Then, the mobile device 10 directly turns off the power of the modem processor 105, and thus the power supplied to the RAM 107 is also turned off. Under such a situation, all data stored in the RAM 107 including the radio ROM image is lost. Once the other processes related to airplane mode on are completed (i.e. related software and hardware de-initialization), the mobile device 10 enters the airplane mode.

As can be seen from the airplane mode off process 20 and the airplane mode on process 30, every time the user turns off and on the airplane mode, a lots of steps need to be performed, which is time consuming and also power consuming. Moreover, since the modem processor 105 independently provides full and complex cellular telephony network service, the radio ROM image size is large. Therefore, when the user frequently turns on and off the airplane mode, the large radio ROM image is lost and then reloaded from NAND flash 109 to RAM 107 frequently, which takes a lot of time.

Figure 4:
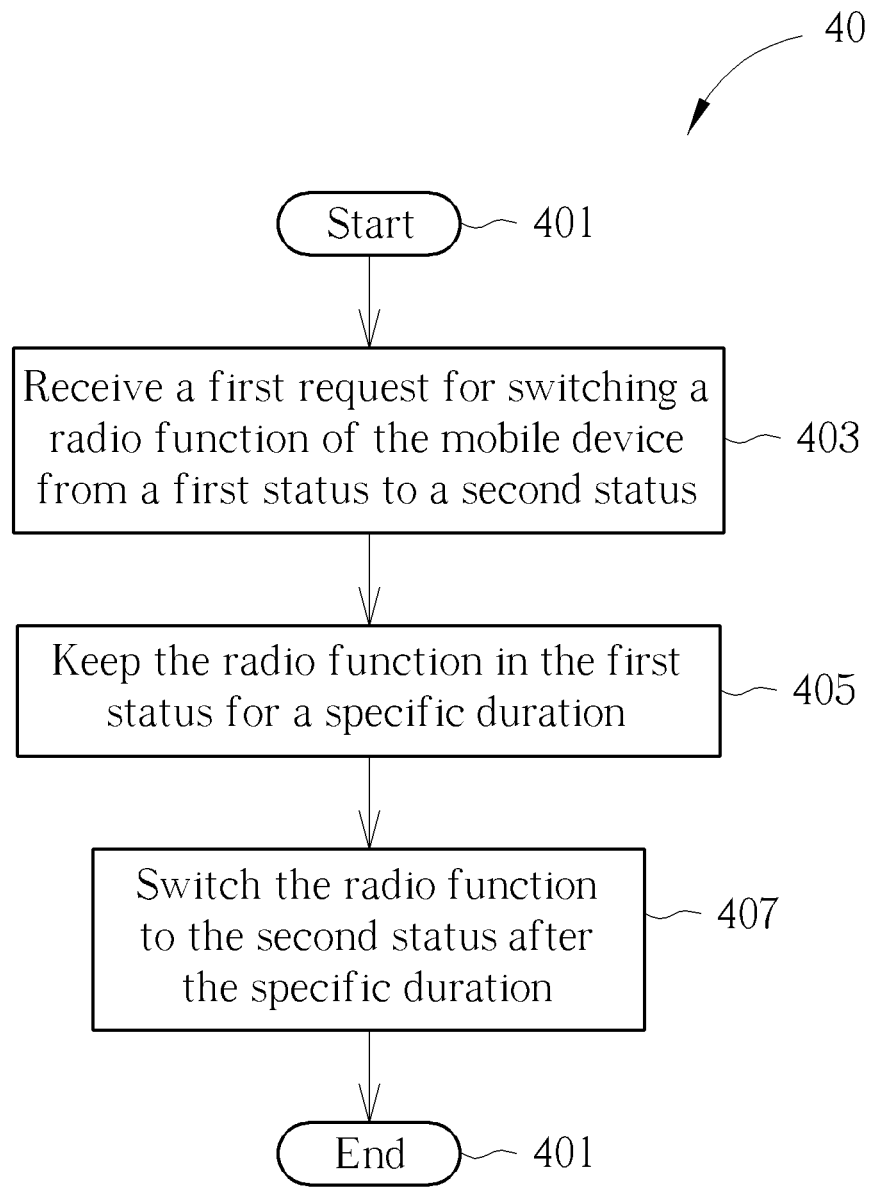
FIG. 4 is a schematic diagram of a status switching process according to an embodiment of the present invention.

Please refer to FIG. 4, which is a schematic diagram of a status switching process 40 according to an embodiment of the present invention. As shown in FIG. 4, the switching process 40 is utilized for the mobile device 10, and includes following steps:

Step 401: Start.

Step 403: Receive a first request for switching a radio function of the mobile device from a first status to a second status.

Step 405: Keep the radio function in the first status for a specific duration.

Step 407: Switch the radio function to the second status after the specific duration.

Step 411: End.

According to the switching process 40, when the mobile device 10 receives a first request for switching a radio function of the mobile device from a first status to a second status, the mobile device 10 continuously keeps the radio function in the first status for a specific duration, and then switches the radio function to the second status after the specific duration. Under such a situation, when the mobile device 10 deactivates an airplane mode in an initial status and then receives an airplane mode on request for switching from deactivating the airplane mode (a first status) to activating the airplane mode (a second status), the mobile device 10 continuously keeps deactivating status of the airplane mode for the specific duration, and then activates the airplane mode after the specific duration. Since the mobile device 10 continuously keeps deactivating status of the airplane mode (the power of the modem processor 105 and RAM 107 is not turned off), the large radio ROM image in RAM 107 is not lost for the specific duration after receiving the airplane mode on request. As a result, if user rapidly switches the airplane mode from deactivating to activating and then deactivating during the specific duration, the mobile device 10 simply stays in deactivating status without involving activating process in order to save time and power of loading the radio ROM image. If there is no additional status switch request from user during the specific duration, the airplane mode is finally activated.

Figure 5:
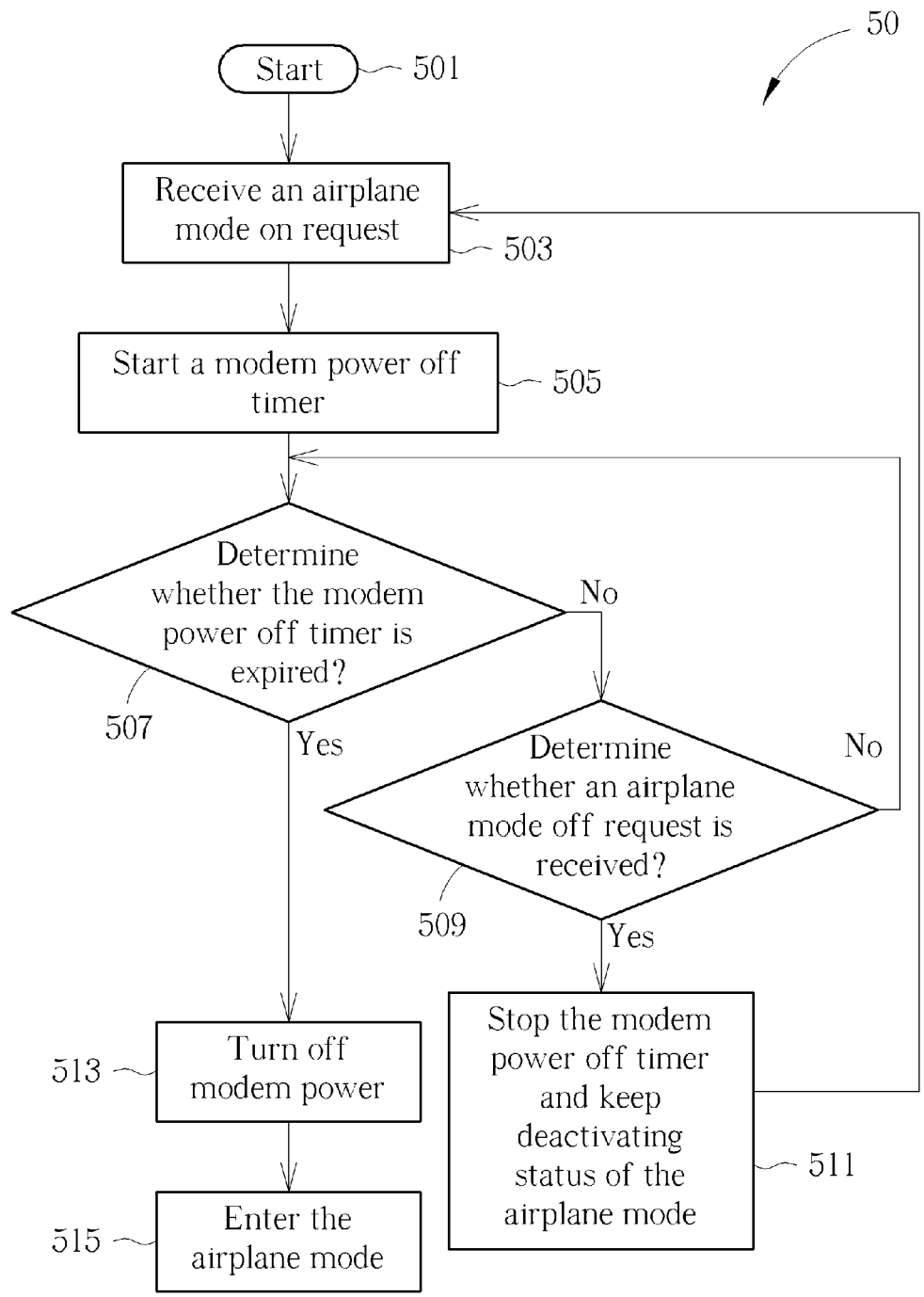
FIG. 5 is a schematic diagram of a status switching process according to another embodiment of the present invention.

In detail, please refer to FIG. 5, which is a schematic diagram of a status switching process 50 according to an embodiment of the present invention. As shown in FIG. 5, the switching process 50 is utilized for the mobile device 10, and includes following steps:

Step 501: Start.

Step 503: Receive an airplane mode on request.

Step 505: Start a modem power off timer.

Step 507: Determine whether the modem power off timer is expired. If the modem power off timer is expired, go to step 513; otherwise, go to step 509.

Step 509: Determine whether an airplane mode off request is received. If an airplane mode off request is received, go to step 511; otherwise, go to step 507.

Step 511: Stop the modem power off timer and keep deactivating status of the airplane mode, go back to step 503.

Step 513: Turn off modem power.

Step 515: Enter the airplane mode.

According to the switching process 50, the mobile device 10 deactivates an airplane mode and thus the cellular telephony network service is enabled in an initial status. Then, when a user requests to turn on the airplane mode (e.g. by tapping the airplane mode UI button or UI image icon on touch panel of the mobile device 10 or pressing a physical key of the mobile device 10), the mobile device 10 receives an airplane mode on request (i.e. a first request) and starts a modem power off timer with an expiration time of a specific duration accordingly. Afterwards, the mobile device 10 determines whether the modem power off timer is expired. Under such a situation, as shown in steps 509, 511, if the modem power off timer is not expired (i.e. during the specific duration), the mobile device 10 determines whether an airplane mode off request (i.e. a second request) is received. If the airplane mode off request is received, the mobile device 10 stops the modem power off timer and keeps deactivating status of the airplane mode. Thus, since the mobile device 10 continuously keeps deactivating status of the airplane mode (the power of the modem processor 105 and RAM 107 is not turned off) during the specific duration (e.g. 5 seconds) and thus the large radio ROM image is not lost, the mobile device 10 does not need to load the radio ROM image again during the specific duration when receiving the airplane mode off request.

Noticeably, during the specific duration, in order to reduce power consumption of the RAM 107 and the modem processor 105, the mobile device 10 switches the RAM 107 to a power saving mode such as lowering a memory clock or performing self-refresh mechanism, and also switches the modem processor 105 to a power saving mode such as entering sleep mode, lowering the processor core voltage or lowering the processor core frequency.

On the other hand, if the airplane mode off request is not received and then the modem power off timer is expired (i.e. after the specific duration), as shown in steps 513, 515, the mobile device 10 terminates all currently running processes executing in the modem processor to let all system programs finish deinitializtion process before turning off the power of the modem processor 105 and the RAM 107. To synchronize the data in the NAND 109 and the RAM 107 to latest status before turning off the power, the mobile device 10 flushes system caches and internal registers and caches of the modem processor 105. Besides, the mobile device 10 backups a current software system status and a hardware configuration status into NAND Flash 109 such that the backed-up status information can be used to speed up reconfiguring procedures (similar to the step 209 for executing the radio ROM image afterward). After finishing the above operations and then turning off the power of the modem processor 105 and the RAM 107, the mobile device 10 enters the airplane mode.

Noticeably, the spirit of the present invention is to continuously keep modem power and thus the large radio ROM image for the specific duration when receiving the airplane mode on request, so as to save time for loading the radio ROM image when frequently switching between activating and deactivating the airplane mode. Those skilled in the art should make modifications or alterations accordingly. For example, the modem power off timer can be a software timer, or a hardware timer. For example, an internal or external real time clock (RTC) alarm timer can be configured with an expiration value, and once the RTC alarm timer expired, the RTC alarm timer generates a hardware interrupt to notice software the expiration time is up. For another example, the mobile device 10 can periodically poll a system time to check whether the expiration time is up.

Besides, the specific time (i.e. the expiration of the modem power off timer) can be fixed (e.g. 5 seconds) or adjustable according user behavior. Specifically, the mobile device 10 can record intervals between receiving the airplane mode on requests and the airplane mode off requests, and adjusts the specific duration according to the historic intervals. For example, if the user frequently requests to switch between activating and deactivating the airplane mode within 3 seconds or 7 seconds instead of 5 seconds, the mobile device 10 records each interval (e.g. 3 or 7 seconds) in the RAM 103, the RAM 107 or the NAND 109 to trace the user behavior. Then, the mobile device 10 can adjust the specific duration as an averaged value of latest 10 recorded intervals. For another example, the specific time can also be directly configured by the user.

Please note that the mobile device 10 may include a computer readable recording medium. The computer readable recording medium is any data storage device that includes a program code, thereafter read and performed by the application processor 101 and the modem processor 105. Examples of the computer readable recording medium include a subscriber identity module (SIM), a universal subscriber identity module (USIM), read-only memory (ROM), random-access memory (RAM), CD-ROMs, magnetic tapes, hard disks, optical data storage devices, and carrier waves (such as data transmission through the Internet). The application processor 101 and the modem processor 105 can execute the program code to perform the processes 20-50.

To sum up, as shown in FIG. 3, when receiving the airplane mode on request, the mobile device 10 may directly turn off modem power and thus the large radio ROM image is lost. Therefore, when the user frequently switches between deactivating and activating the airplane mode, the mobile device 10 needs a lot of time for frequently loading the large radio ROM image. In comparison, when receiving the airplane mode on request, the present invention continuously keeps modem power and thus the large radio ROM image is not lost for the specific duration, so as to save time for loading the radio ROM image when frequently switching between activating and deactivating the airplane mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A status switching method for a radio function of a mobile device, wherein the mobile device comprises a first volatile memory and a second volatile memory separately and an application ROM image corresponding to a user operating system and user layer applications is loaded into the first volatile memory and a radio ROM image corresponding to the radio function is loaded into the second volatile memory for executing the radio function, the status switching method comprising:
   receiving a first request for switching the radio function of the mobile device from a first status to a second status;
   remaining the radio function in the first status without reloading the radio ROM image into the second volatile memory if receiving a second request for switching the radio function of the mobile device from the second status to the first status during a first duration; and
   switching the radio function from the first status to the second status in response to the receiving of the first request if not receiving a second request for switching the radio function of the mobile device from the second status to the first status during the first duration.

2. The status switching method of claim 1, wherein the first status of the radio function is activating an airplane mode of the mobile device, and the second status of the radio function is deactivating the airplane mode.

3. The status switching method of claim 1, wherein the first status of the radio function indicates a specific cellular network is activated, and the second status of the radio function indicates the specific cellular network is deactivated.

4. The status switching method of claim 3, wherein the specific cellular network is global system for mobile communications (GSM), universal mobile telecommunications system (UMTS), code division multiple access (CDMA), wideband code division multiple access (WCDMA) or long term evolution (LTE).

5. The status switching method of claim 1 further comprising:
   recording at least one interval between receiving the first request and the second request.

6. The status switching method of claim 5 further comprising:
   automatically adjusting the first duration according to the at least one interval.

7. The status switching method of claim 1 further comprising:
   terminating currently running system processes after the first duration.

8. The status switching method of claim 1 further comprising:
   flushing system caches of the mobile device after the first duration.

9. The status switching method of claim 1 further comprising:
   backing up a current software system status and a hardware configuration status of the mobile device after the first duration.

10. The status switching method of claim 1 further comprising:
    lowering a memory clock or performing self-refresh during the first duration.

11. The status switching method of claim 1 further comprising:
    lowering a core voltage of the modem processor or lowering an operating frequency of the modem processor during the first duration.

12. The status switching method of claim 1, wherein the first duration is adjustable by a user.

\* \* \* \* \*